United States Patent
Endoh et al.

(10) Patent No.: US 8,043,660 B2
(45) Date of Patent: Oct. 25, 2011

(54) METHOD FOR MANUFACTURING POLYCRYSTALLINE SILICON

(75) Inventors: Toshihide Endoh, Suzuka (JP);
Masayuki Tebakari, Saitama (JP);
Toshiyuki Ishii, Yokkaichi (JP);
Masaaki Sakaguchi, Suzuka (JP);
Naoki Hatakeyama, Yokkaichi (JP)

(73) Assignee: Mitsubishi Materials Corporation, Tokyo (JP)

( * ) Notice: Subject to any disclaimer, the term of this patent is extended or adjusted under 35 U.S.C. 154(b) by 528 days.

(21) Appl. No.: 12/292,793

(22) Filed: Nov. 26, 2008

(65) Prior Publication Data

US 2009/0136666 A1    May 28, 2009

(30) Foreign Application Priority Data

Nov. 28, 2007 (JP) ................................. 2007-307445

(51) Int. Cl.
*C23C 16/00* (2006.01)
(52) U.S. Cl. ......... 427/255.393; 427/255.27; 427/248.1; 427/255.28
(58) Field of Classification Search ............... 427/248.1, 427/255.27, 255.393
See application file for complete search history.

(56) References Cited

U.S. PATENT DOCUMENTS 4,125,643 A * 11/1978 Reuschel et al. ................. 427/9
4,148,931 A    4/1979 Reuschel et al.

FOREIGN PATENT DOCUMENTS

| GB | 356306 | | 9/1931 |
| JP | 05138015 A | * | 6/1993 |
| JP | 05139891 A | * | 6/1993 |
| JP | 2003-128492 A | | 5/2003 |
| JP | 3660617 | | 5/2003 |

OTHER PUBLICATIONS

European Search Report for European Patent Application No. 08170038.7 issued Jan. 27, 2011.

* cited by examiner

*Primary Examiner* — David Turocy
(74) *Attorney, Agent, or Firm* — Edwards Angell Palmer & Dodge LLP

(57) ABSTRACT

A method for manufacturing polycrystalline silicon with high quality by effectively preventing undesired shape such as giving an rough surface to silicon rods or an irregularity in diameter of the silicon rods. The method for manufacturing polycrystalline silicon includes: an initial stabilizing step of deposition wherein a velocity of ejecting the raw material gas from the gas ejection ports is gradually increased; the shaping step wherein first the ejection velocity is increased at a rate higher than that in the stabilizing step and then the ejection velocity is gradually increased at a rate lower than the previous increasing rate; and a growing step wherein, after the shaping step, the ejection velocity is made slower than that at the end of the shaping step until the end of the deposition.

7 Claims, 7 Drawing Sheets

METHOD FOR MANUFACTURING POLYCRYSTALLINE SILICON

BACKGROUND OF THE INVENTION

1. Field of the Invention

The present invention relates to a method for manufacturing polycrystalline silicon, which is for manufacturing a polycrystalline silicon rod by depositing polycrystalline silicon on a surface of a heated silicon seed rod.

Priority is claimed on Japanese Patent Application No. 2007-307445, filed Nov. 28, 2007, the content of which is incorporated herein by reference.

2. Description of the Related Art

As one of methods for manufacturing polycrystalline silicon, there has been known a so-called Siemens method used for manufacturing polycrystalline silicon. This method includes heating a plurality of silicon seed rods, arranged within a reaction furnace, supplying a raw material gas which is a mixed gas of chlorosilane gas and hydrogen gas into the reaction furnace thereby bringing the raw material gas into contact with the heated silicon seed rods, and allowing polycrystalline silicon to deposit on surfaces of the silicon seed rods by pyrolysis and hydrogen reduction of the raw material gas.

For such a method for manufacturing polycrystalline silicon, silicon seed rods which serve as seed cores are fixedly stood on respective electrodes arranged on an inner bottom part of the reaction furnace, with the upper portion of each of the silicon seed rods connected to each other by device of a short connecting member to thereby form a Π shape. A plurality of raw material gas ejection nozzles is dispersively-arranged between the erected silicon seed rods in the inner bottom part of the reaction furnace. When an electric current is applied from the electrodes to the silicon seed rods, the silicon seed rods are heated due to the resistance. Thus, when the raw material gas ejected from the ejection nozzles comes into contact with the surfaces of the silicon seed rods, polycrystalline silicon is deposited and grown in a radical direction to form silicon rods.

In this connection in the prior art, as disclosed, for example, in Japanese Patent No. 3660617, a control is needed to keep the rod surface temperature and the supply amount of the raw material per unit area of the rod surface in respective predetermined ranges until the termination of a deposition except for an initial stage of the deposition. In other words, since the surface area of a silicon rod increases with the growth of the silicon rod, the amount of raw material gas to be supplied is increased in accordance with the growth of the silicon rod.

However, when there is a large number of silicon seed rods thereby becoming closely packed together, there occurs a problem that it may become difficult to uniformly supply the raw material gas to the surface of the silicon seed rods, which results in undesired shape, such as giving an rough surface to silicon rods, and thus lowers the proportion of polycrystalline silicon with a smooth surface which is necessary to be suited as a raw material for manufacturing single crystal silicon. As disclosed in Japanese Patent No. 3660617, the method of merely increasing the amount of raw material gas to be supplied with growth of silicon rods requires an enhanced supply facility and thus grows in cost.

In consideration of the above circumstances, an object of the present invention is to provide a method for manufacturing polycrystalline silicon, which allows producing a larger amount of high quality polycrystalline silicon having smooth surface morphology by effectively preventing a silicon rod surface from being malformed.

SUMMARY OF THE INVENTION

According to an aspect of the present invention, there is provided a method for manufacturing polycrystalline silicon, in which a plurality of silicon seed rods erected in a reaction furnace is heated and polycrystalline silicon is deposited on surfaces of the silicon seed rods by a raw material gas ejected from gas ejection ports located in an inner bottom part of the reaction furnace, the method including: an initial stabilizing step of deposition wherein the velocity of ejecting the raw material gas from the gas ejection ports is gradually increased; a shaping step wherein first the ejection velocity is increased at a rate higher than that in the stabilizing step and then gradually the ejection velocity is increased at a rate lower than the previous increasing rate; and a growing step wherein, after the shaping step, the ejection velocity is made slower than that at the end of the shaping step until the end of the deposition.

In the initial stabilizing step of the deposition, since the posture of silicon seed rods is not yet stabilized, the ejection velocity of the raw material gas is gradually increased at a low rate in order to suppress swing of the silicon seed rods. As a result, silicon is reliably deposited at an interface between silicon seed rods and connecting members and spaces between silicon seed rods and electrodes where the interfaces are the cause of instability, thereby stabilizing the posture of silicon seed rods. After the stabilizing step, by once increasing the ejection velocity at a rate higher than that in the stabilizing step, the raw material gas can be sufficiently supplied to the upper sides of long silicon rods. After once such increase of the ejection velocity at a rate higher than that in the stabilizing step, by gradually increasing the gas ejection velocity at a rate lower than the increasing rate by increasing the amount of gas supply, fresh raw material gas is sufficiently supplied to the entire surfaces of the silicon rods so that corners of the silicon seed rods can be grown into a round rod shape. After the silicon rods are grown into the round rod shape, the ejection velocity is made slower than that at the end of the shaping step so as to allow efficient growth of silicon rods.

In the method, the duration required for the shaping step corresponds to 20 to 35% of the total deposition duration from the start to end of the deposition.

If the duration taken for the shaping step is shorter than 20% of the total deposition duration, since the process proceeds to the subsequent stage with some cornet of the seed shape remained, a proportion of polycrystalline silicon rods having smooth surface topography may be reduced. If the duration taken for the shaping step is longer than 35% of the total deposition duration, the surface temperature of the silicon rods is lowered, which results in hindrance of growth of polycrystalline silicon rods, hence decreasing the yield.

In the method, a plurality of the gas ejection ports is branched from a gas supplying pipe, and in the shaping step, the ejection velocity from some gas ejection ports is increased by closing other of the gas ports of the plurality of gas ejection ports. In this case, in the growing step, the ejection velocity of the raw material gas is decreased by making the number of closed gas ejection ports less than that in the shaping step.

In the method, by controlling the opened/closed state of the gas ejection ports, it is possible to control the ejection velocity of the raw material gas without accompanying a enhanced of the existing facility.

In the method, in the shaping step, 30% to 55% of the gas ejection ports are closed. If the percentage of closed gas ejection nozzles is less than 30%, the raw material gas is hardly evenly spread up to the upper sides of the long silicon rods. If this percentage is more than 55%, the difference in temperature between the silicon rod surface adjacent to ejection nozzles into which the gas flow in and a silicon rod surface adjacent to ejection nozzles into which the gas does not flows in becomes large. As a result, the silicon rods may be damaged by thermal stress applied to the silicon rods.

In the method, in the growing step, 10% to 20% of the gas ejection ports are closed, If percentage of closed ejection nozzles is less than 10%, the ejection velocity of the raw material gas is not sufficient, which may result in undesired shape morphology. If this percentage is more than 20%, the ejection velocity of the raw material gas become too high, which may result in inhibition to efficient growth of the silicon rods.

In the method, the gas ejection ports to be closed are switched to the other gas ejection ports thereby switching between the opened/closed state, at every predetermined duration. This is carried out for even ejection of the raw material gas without being biased to certain gas ejection ports.

EFFECTS OF THE INVENTION

According to the polycrystalline silicon manufacturing method of the present invention, by first rapidly increasing and then slowly increasing the ejection velocity of the raw material gas after the initial stabilizing step of the deposition, the raw material gas can be sufficiently spread up to the upper sides of the long silicon rods and accordingly a fresh raw material gas can be sufficiently supplied over the entire surface, thereby forming silicon rods having uniform surface topography. In addition, by decreasing the ejection velocity of the raw material gas during the growing step of the silicon rods, the silicon rods can be efficiently grown. Furthermore, since only the supply of raw material gas is controlled, silicon rods can be formed without changing the scale of existing manufacturing apparatuses.

DETAILED DESCRIPTION OF THE INVENTION

Hereinafter, a method for manufacturing polycrystalline silicon according to embodiments of the present invention will be described with reference to the accompanying drawings.

Figure 1:
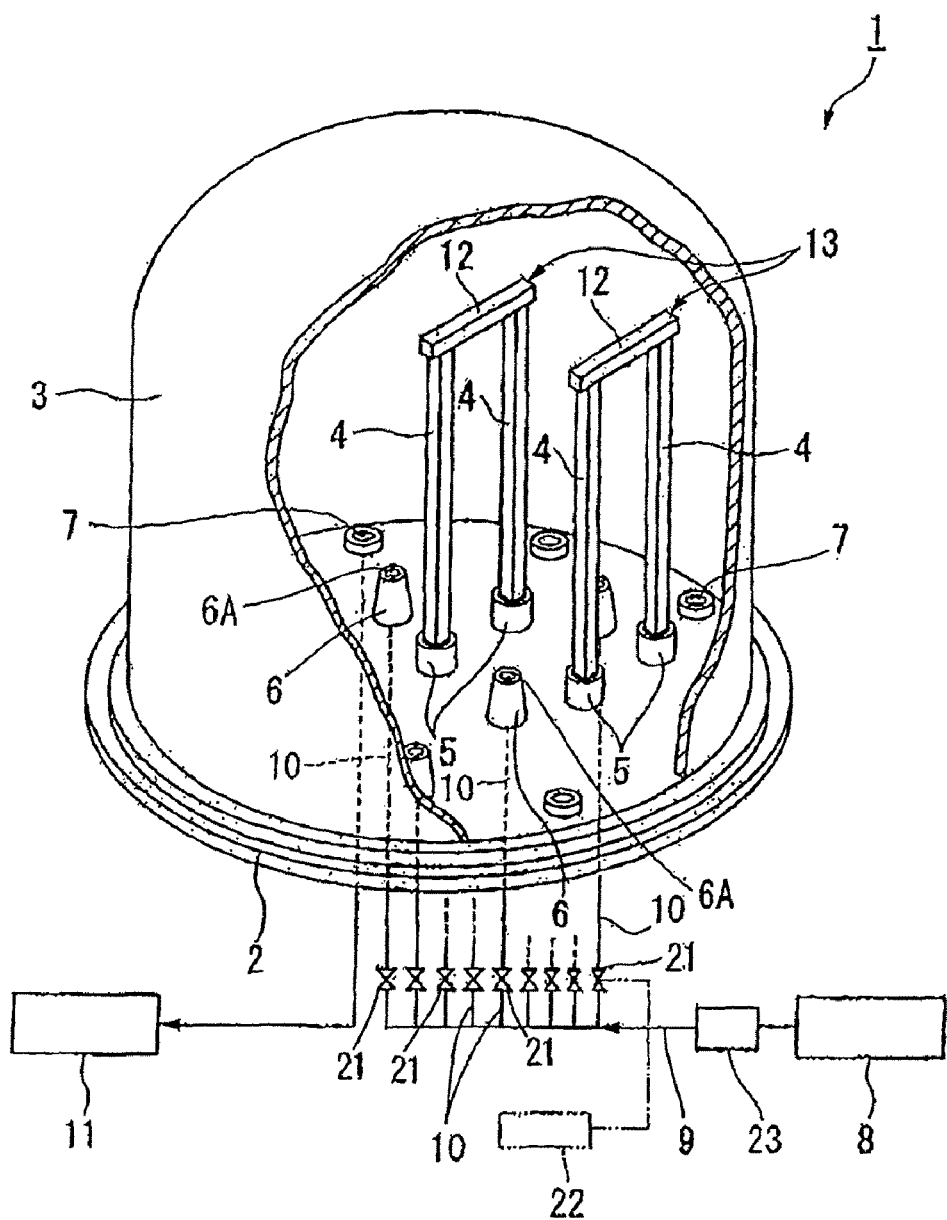
FIG. 1 is a partial-cut perspective view of a bell jar of a reaction furnace.

FIG. 1 shows the entire configuration of an apparatus used for manufacturing polycrystalline silicon in accordance with an embodiment of the present invention. As shown, a reaction furnace 1 of the polycrystalline silicon manufacturing apparatus includes a bottom plate 2 as a furnace bottom, and a hanging bell-like bell jar 3 detachably mounted on the bottom plate 2.

As shown in FIG. 1, on the bottom plate 2, a plurality of pairs of electrodes 5 mounted with silicon seed rods 4 becoming polycrystalline silicon cores, a plurality of ejection nozzles 6 for ejecting a raw material gas including a chlorosilane gas and a hydrogen gas into the reaction furnace, and a plurality of gas discharging ports 7 for discharging a reacted gas out of the reaction furnace are provided.

The plurality of ejection nozzles 6 of the raw material gas is arranged throughout the upper side of the bottom plate 2 of the reaction furnace 1 with appropriate intervals so that the raw material can be evenly supplied to the silicon seed rods 4. These ejection nozzles 6 are each connected to one gas supplying pipe 9 via respective gas distribution pipes 10. The gas supplying pipe 9 is connected with a raw material gas supplying source 8 provided outside the reaction furnace 1. The plurality of gas discharging ports 7 are arranged with appropriate intervals on the area neighboring the circumference of the bottom plate 2 and are connected to an exhaust gas processing system 11.

Figure 3:
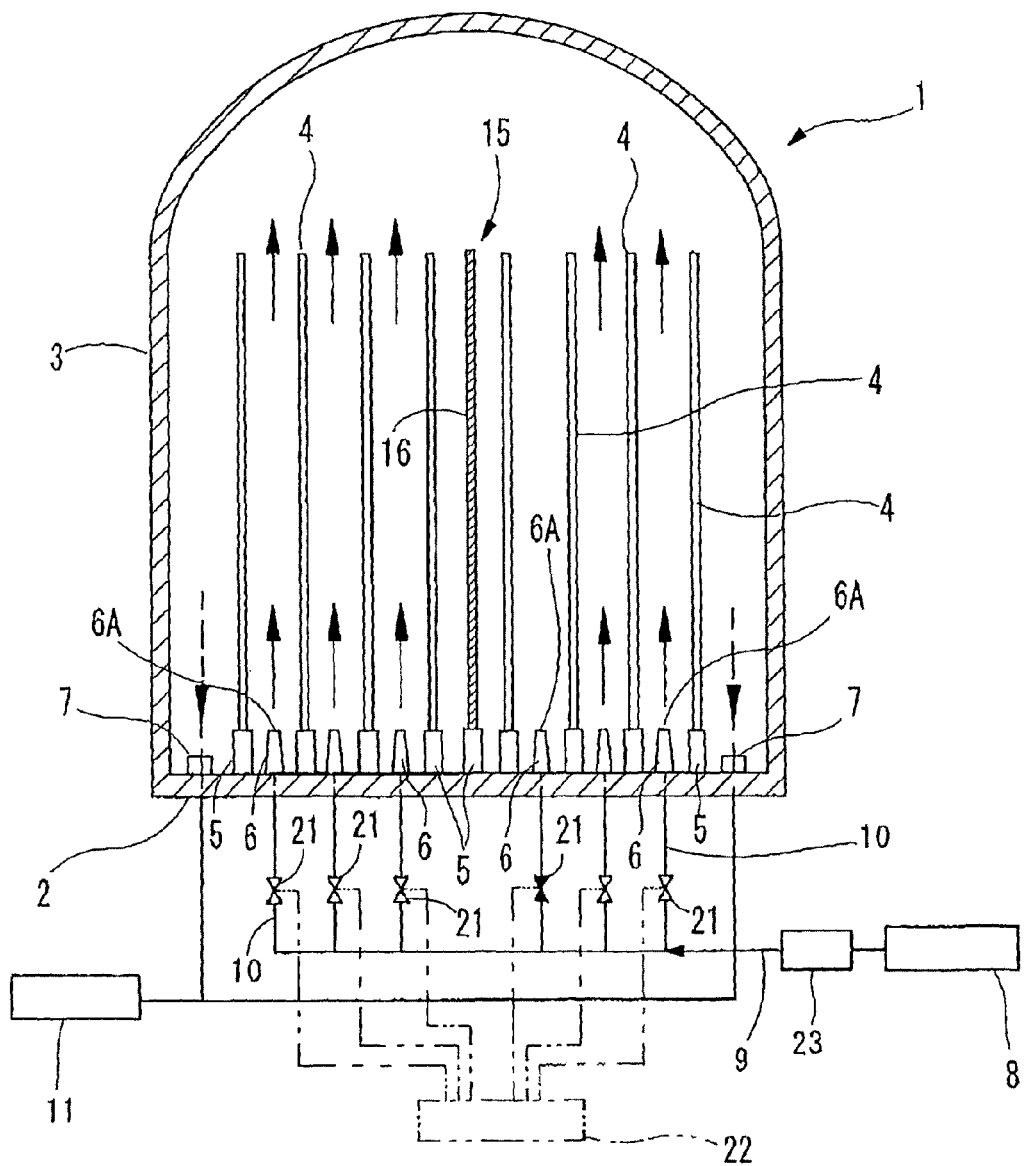
FIG. 3 is a longitudinal-sectional view of the reaction furnace of FIG. 1.

In this case, as shown in FIG. 3, as the ejection nozzles 6 project from the upper side of the bottom plate 2 (the bottom side of the reaction furnace 1), gas ejection ports 6a of leading ends of the ejection nozzles are located apart from the upper surface of the bottom plate 2 by a certain height, On the other hand, the gas discharging ports 7 are disposed at a position lower than the gas ejection ports 6A of the ejection nozzles 6.

The electrodes 5 are composed of cylinder-shaped carbon. The electrodes 5 are substantially concentrically arranged on the bottom plate 2 with predetermined intervals and are vertically erected on the bottom plate 2. In addition, the electrode 5 have respective ports (not shown) formed along their respective axes. The lower ends of the silicon seed rods 4 are respectively inserted in the ports. In the example shown in FIG. 3, the electrodes 5 have substantially the same height as the ejection nozzles 6.

In addition, with the lower ends of the silicon seed rods 4 inserted in the electrodes 5, the silicon seed rods 4 are erected with upward extension, as shown in FIGS. 1 and 3. The upper ends of a pair of silicon seed rods 4 are connected to each other by one short connecting member 12. The connecting member 12 is made of the same silicon as the silicon seed rods 4. The pair of silicon seed rods 4 and the connecting member 12 form a Π-shaped seed assembly 13.

Figure 2:
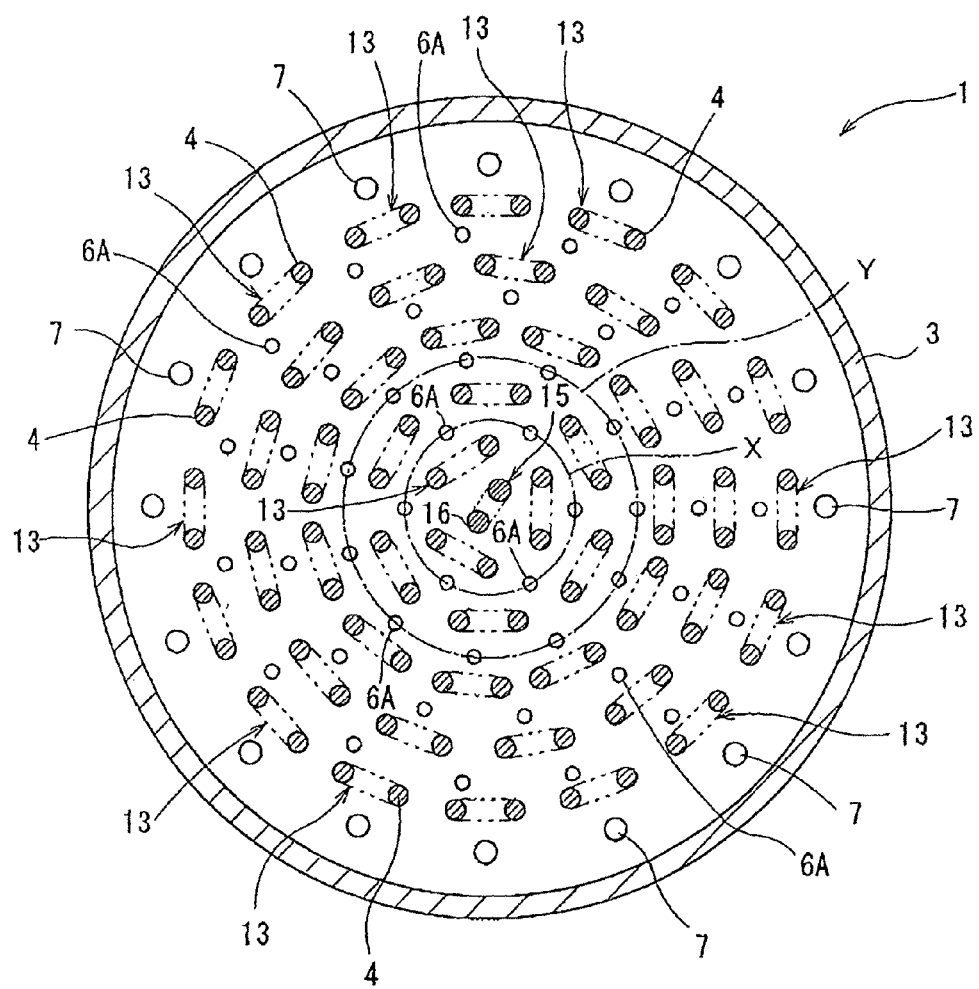
FIG. 2 is a horizontal cross-sectional view of the reaction furnace of FIG. 1.

As shown in FIG. 2, as the electrodes 5 are concentrically arranged in the reaction furnace 1, seed assemblies 13 are also concentrically arranged as a whole. However, all of the seed assemblies 13 are not necessarily concentrically arranged, but the silicon seed rods 4 of some of the seed assemblies 13 may, for example, be arranged in a radial direction.

In addition, although not shown in FIG. 1, a heating device 15 is provided at the center of the reaction furnace 1, as shown in FIGS. 2 and 3. In this embodiment, the heating device 15 includes a rod-like carbon heater 16 erected with a Π shape on an electrode 5 on the bottom plate 2 and is set at about the same height as the silicon seed rods 4 so that the overall length of silicon seed rods 4 can be irradiated with radiation heat.

In addition, valves 21 to opened/closed internal pipelines are provided on respective gas distribution pipes 10. A valve control device 22 to control opened/closed of the valves 21 is connected to the valves 21. The valve control device 22 controls the raw material gas ejection by opening/closing the valves 21. However, in addition to control of the opened/closed of all of the valves 21 in start and end of deposition, the valve control device 22 can control the ejection velocity from the ejection ports 6A by controlling the opened/closed of each of the valves 21 for the gas distribution pipes 10 of the ejection nozzles 6 in an initial stabilizing step after the start of the deposition, a shaping step after the stabilizing, and a growing step until the end of the deposition after the shaping step, which will be described later. In FIG. 1, a numeral 23 refers to a raw material gas control device which is to control the pressure and flow rate of the raw material gas supplied from the raw material gas supplying source 8.

When polycrystalline silicon is manufactured using the above-constructed apparatus, the heating device 15 and the silicon seed rods 4 are first heated by applying an electric current to the electrodes 5 connected to the heating device 15, which is arranged at the center of the reaction furnace 1, and the silicon seed rods 4. At this duration, since the heating device 15 is composed of the carbon heater 16, the heating device 15 is heated earlier than the silicon seed rods 4, and radiation from the carbon heater 16 is transferred to the silicon seed rods 4 located at the innermost circumference thereby heating the rods from the surface. When the temperature of the silicon seed rods 4 having high resistance at normal temperature is increased, their resistivity is decreased. This allows the silicon seed rods 4 to be put into a conduction state and hence to be heated by a current applied from their respective electrodes 5. The heat from the silicon seed rods 4 is transferred to other neighboring silicon seed rods 4 for heating them. Such a heat transfer effect propagates in turn in a radial direction of the reaction furnace 1, and accordingly, all the silicon seed rods 4 in the reaction furnace 1 become conductive and are heated. When the temperature of the silicon seed rods 4 increases up to a decomposition temperature of the raw material gas, the raw material gas ejected from the ejection nozzles 6 allows the deposition of polycrystalline silicon on the surfaces of the silicon seed rods 4. The deposited polycrystalline silicon is diametrically grown to be a silicon rod.

Figure 4:
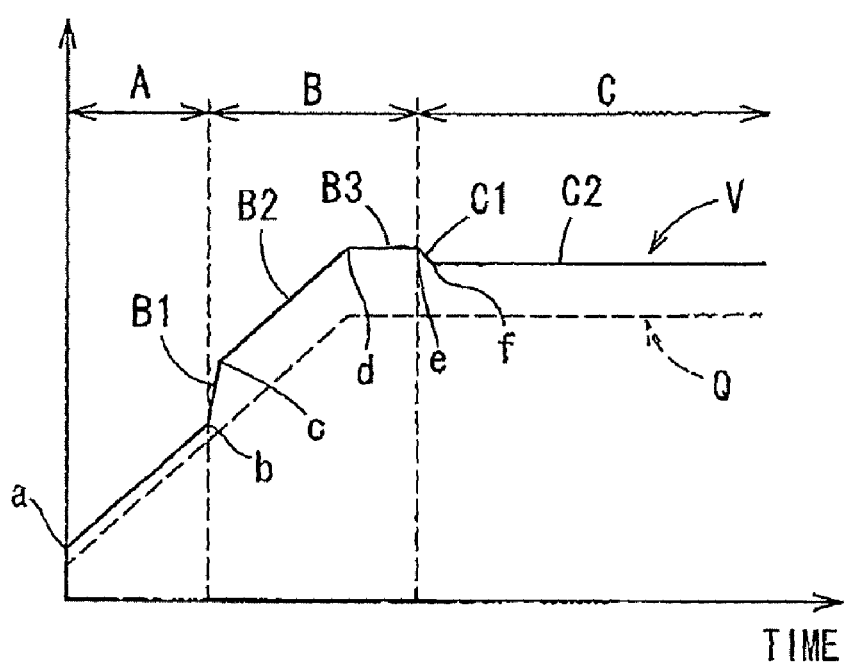
FIG. 4 is a graph showing a change in each step with respect to an ejection velocity and a flow rate of a raw material gas in a method for manufacturing polycrystalline silicon according to an embodiment of the present invention.
Figure 5:
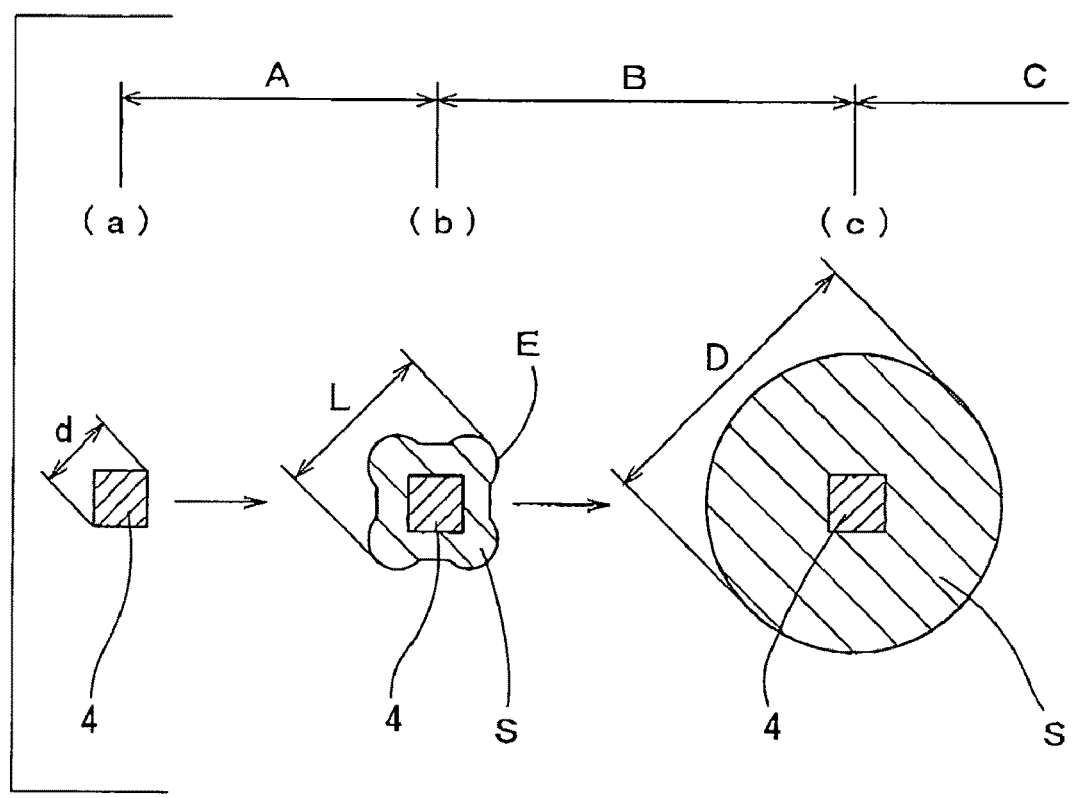
FIG. 5 is a model diagram showing a relation between deposition of polycrystalline silicon onto a silicon seed rod and a growing step.

With the growth of the silicon rod, the opened/closed of the valves 21 is controlled for each of the above-mentioned three steps so that the ejection velocity from the ejection nozzles 6 can be controlled. FIG. 4 is a graph showing a change in each step with respect to an ejection velocity V and a flow rate Q of the raw material gas from the ejection nozzles 6, where the horizontal axis represents duration and A, B and C represent a stabilizing step, a shaping step and a growing step, respectively. FIG. 5 is a model diagram showing a relation between the deposition of polycrystalline silicon onto the silicon seed rod 4 and the growth step. Also in FIGS. 5, A, B and C represent a stabilizing step, a shaping step and a growing step, respectively. A control method for each step will be described below.

A. Stabilizing Step (First Step)

In the initial stabilizing step of the deposition, ejection nozzles 6 located in the innermost and those second to the circumference of the reaction furnace 1, preferably, ejection nozzles 6 of 5 to 15% of the total number of ejection nozzles in the reaction furnace 1, are selected, and the valves 21 of the gas distribution pipes 9 connected to the selected ejection nozzles 6 are controlled to be closed. It is preferable that the ejection nozzles 6 are evenly selected so that both the two adjacent ejection nozzles on the same circumference are not closed at the same duration. After the valves 21 of the selected ejection nozzles 6 are closed for a predetermined period of duration, other ejection nozzles 6 are selected and switched between opened/closed of the valves 21. Likewise, this deposition is controlled to be repeated for a predetermined period of duration. The switching of the opened/closed of the valves 21 is automatically performed by a computer.

In this stabilizing step, as shown in FIG. 4, as the flow rate Q increases, the ejection velocity V gradually increases from 'a' to 'b'. In this case, the ejection velocity V is an average initial velocity in the gas ejection ports 6A of the ejection nozzles 6 having a tube shape.

For example, the ejection velocity from the gas ejection ports 6A is 15 m/sec at a point 'a' and 40 n/sec at a point 'b' in FIG. 4.

The control in this stabilizing step is for giving a smooth gas flow by stopping the gas ejection from a part of ejection nozzles 6 and guiding a descending flow to the portion while some of the ascending flow ejected from the ejection nozzles 6 in the inner bottom portion of the reaction furnace 1 becomes the descending flow by collision with the ceiling of the bell jar 3, which interferes with the ascending flow, thereby dispersing the gas flow, which may result in shake and damage of the silicon seed rods 4. During the step, polycrystalline silicon is deposited on the silicon seed rods 4 inserted in the electrodes 5 and is adhered near around the insertion portion of the silicon seed rods 4 in the electrodes 5, thereby stabilizing the posture of the silicon seed rods 4. It takes about one day to stabilize the posture of the silicon seed rods 4. Thereafter, the process proceeds to the next step. If the cross section of the silicon seed rods 4 is a rectangular shape as shown in FIG. 5A, as a reference of the end of the stabilizing step, polycrystalline silicon S is deposited with a diagonal length L which is two to three durations larger than a diagonal length d in the rectangular cross section of the silicon seed rods 4, as shown by a cross section in FIG. 5B.

B. Shaping Step (Second Step)

Next, in the shaping step, after the ejection velocity from the ejection nozzles 6 is once increased at a rate higher than that in the stabilizing step as indicated by B1, the ejection velocity is controlled to be gradually increased at the same rate as in the stabilizing step (as indicated by B2). Specifically, the valves 21 of ejection nozzles 6 of the number corresponding to 30% to 55% of the total number of ejection nozzles amongst the ejection nozzles 6 distributed in the inner bottom portion of the reaction furnace 1 are controlled to be closed for a predetermined period of duration. Since these ejection nozzles 6 are branched from the gas supplying pipe 9, when the valves 21 of the ejection nozzles 6 are closed, the ejection velocity from other opened ejection nozzles 6 is increased. Thereafter, the flow rate is increased with the increase of this ejection velocity (B2 in FIG. 4).

For example, the ejection velocity from the gas ejection ports 6A becomes 60 m/sec at a point 'c' and 120 m/sec at a point 'd' as in FIG. 4, and the duration from the point 'b', which is the end point of the stabilizing step, to the point 'c' becomes one hour or so.

In this shaping step, the ejection nozzles are evenly selected so that the closed ejection nozzles 6 are not biased to a particular position. In this case, the closed ejection nozzles 6 are switched to other ejection nozzles 6 for predetermined duration.

This shaping step is a step in which a corner E (see a section in FIG. 5B) of the polycrystalline silicon S becomes round at a corner of the silicon seed rod 4 having a rectangular cross section by going through the stabilizing step, thereby forming a round rod as shown by a section in FIG. 5C. As a reference of the end of this shaping step, the polycrystalline silicon S is deposited with an outer diameter D which is six to ten durations the diagonal length d of the silicon seed rod 4.

Whether or not the polycrystalline silicon S deposited on the silicon seed rod 4 has a round rod shape has a great effect on the surface topography of the silicon rod. Accordingly, the important thing is to supply the raw material gas evenly to the surface of the silicon seed rods, Therefore, by increasing the ejection velocity from the ejection nozzles 6 and hence increasing the flow rate of the raw material gas at the surface of the silicon rod, it is possible to sufficiently spread the raw material gas up to the upper side of the long silicon rod. In this case, since the silicon seed rods 4 have been strongly adhered to the electrodes 5 in the previous stabilizing step, the stable posture of the silicon seed rods 4 can be maintained even with the increase of the gas.

This control is performed for 20 to 35% of the overall deposition duration while switching the closed ejection nozzles 6 for a predetermined period of duration. For example, the control is automatically performed by a computer while switching a plurality of position patterns of the closed ejection nozzles 6. In addition, as indicated by a dashed line in FIG. 4, although the flow rate of the raw material gas is increased with an increase of the diameter of the silicon rod, the flow rate is controlled to be constant in the second half of the shaping step and accordingly the ejection velocity becomes constant, as shown by B3 in FIG. 4.

If the duration taken for the shaping step is shorter than 20% of the overall deposition duration, since the process proceeds to the subsequent step with some angled seed shape left, the percentage of polycrystalline silicon rods having smooth surface topography may be lowered. If duration taken for the shaping step is longer than 35% of the overall deposition duration, the surface temperature of the silicon rods is lowered, which results in hindrance of growth of polycrystalline silicon rods and hence decrease of the yield.

If the percentage of the ejection nozzles in the closed state is less than 30%, the raw material gas is not evenly supplied to the upper side of the long silicon rod. If this percentage is more than 55%, the difference in temperature between the silicon rod surface adjacent to the ejection nozzles into which the gas flows and the silicon rod surface adjacent to the ejection nozzles into which the gas does not flow becomes large. As a result, the silicon rod may be damaged by thermal stress applied to the silicon rod.

C. Growing Step (Third Step)

After the silicon rod has the round rod shape through the shaping step, the number of closed ejection nozzles 6 is reduced to 10% to 20% of the total number of ejection nozzles and the position of the closed ejection nozzles 6 is controlled to be switched for a predetermined period of duration. This control allows decrease of the ejection velocity, as shown by C1 in FIG. 4. For example, the ejection velocity becomes 120 m/sec at a point 'e', which is the end point of the shaping step, and 90 m/sec at a point 'f' in FIG. 4. Since the flow rate remains constant after the second half of the shaping step, once the ejection velocity is decreased, and continues the decreased ejection velocity, as shown by C2 in FIG. 4. The surface temperature of silicon rod is reached 900~1100 degrees Celsius. In contrast, the temperature of raw material gas from the ejection nozzle 6 is reached about 100 degrees Celsius. Therefore, the control in this growing step is for suppressing sensible heat by the raw material gas by decreasing the ejection velocity, and efficiently using thermal energy of the silicon rod surface obtained by Joule heating to grow the silicon rod.

If the percentage of the ejection nozzles 6 in the closed state is less than 10%, the ejection velocity of the raw material gas is not sufficient, which may result in undesired shape morphology. If this percentage is more than 20%, the ejection velocity of the raw material gas become too high, therefore it may result in hindrance to efficient growth of the silicon rod.

Here, the predetermined period of duration is preferably 10 minutes to 60 minutes. If the predetermined period of duration is less than 10 minutes, the flow of the raw material gas within the reaction furnace 1 cannot be stabilized. In addition, since the number of durations of opened/closed of the valves 21 is increased, deterioration of the valves 21 may be accelerated, which may result in a reduction of the lifetime of the valves. If the predetermined period of duration is more than 60 minutes, the raw material gas cannot be sufficiently supplied to the surfaces of the silicon seed rods 4 adjacent to the ejection nozzles 6 connected to the closed valves 21, which results in adverse effects on of crystal growth and formation of good surface morphology.

In this case, the detailed position of the closed ejection nozzles 6 is selected with reference to final conditions of silicon rod in previous reaction batch or conditions on silicon rods viewed through a sight glass (not shown) of the reaction furnace. The control of this growing step is performed until the end of deposition after the shaping step.

As described above, by controlling the ejection velocity of the raw material gas from the ejection nozzles 6 with the deposition duration of the silicon rod, while supplying the raw material gas with the initial relatively slow increase of the ejection velocity, the flow of the gas in the middle portion of the reaction furnace 1 is particularly controlled to deposit polycrystalline silicon on the silicon seed rods 4 and stabilize the posture of the silicon rods. Thereafter, by once rapid increasing and then slowly increasing the ejection velocity of the raw material gas from the ejection nozzles 6 to sufficiently supply fresh raw material gas to the surface and upper side of the silicon rod, the silicon seed rods are changed from an angled shape to an round shape. Lastly, the ejection velocity is limited in order to accelerate efficient growth of the silicon rod. Such an ejection velocity control allows efficient shaping of high quality silicon rods having smooth surface topography. In addition, since the valves 21 connected to the ejection nozzles 6 are merely controlled, silicon rods can be formed without enhancement of existing facilities.

The following test was made for determining the above-described effects.

Figure 6A:
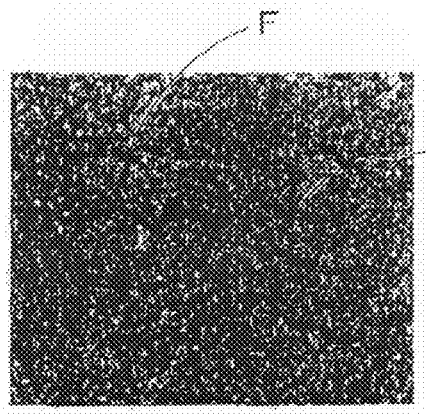
FIG. 6 is a photograph showing a surface condition of deposition of polycrystalline silicon
Figure 6B:
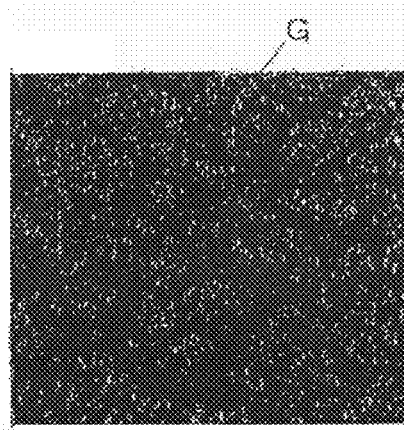
Figure 6C:
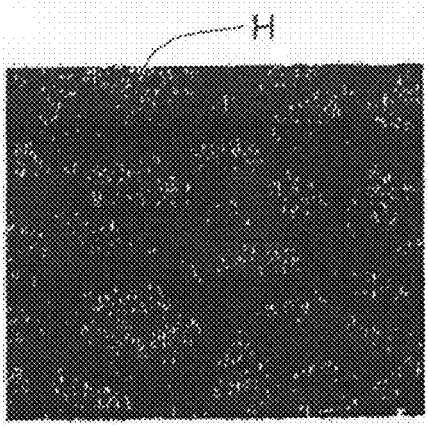

In this test, a reaction furnace having 45 gas supplying ports was used and deposition of polycrystalline silicon was carried out for 118 hours under controls of each of the examples and the comparative example shown in Table 1. Weights (1) of the deposited polycrystalline silicon, percentages (2) of smoothness of rod-shaped polycrystalline silicon, and yields ((1)×(2)) of smooth surfaces were compared. As shown by FIG. 6 of a photograph showing a surface condition of deposition of polycrystalline silicon, the smooth surface refers to a surface condition in which bottoms F of concave portions in unevenness of the rod-shaped polycrystalline silicon surfaces can be clearly recognized and no gaps can be observed when viewed from the surfaces in FIG. 6A, or a surface condition in which the bottoms of concave portions cannot be clearly recognized and the surfaces have no independent grains although gaps G can be observed in FIG. 6B. Undesired shape morphology refers to a condition where the surfaces have independent grains H when viewed from the surfaces in FIG. 6C.

Controlling items for each step are as follows.

A. Stabilizing Step

Figure 7A:
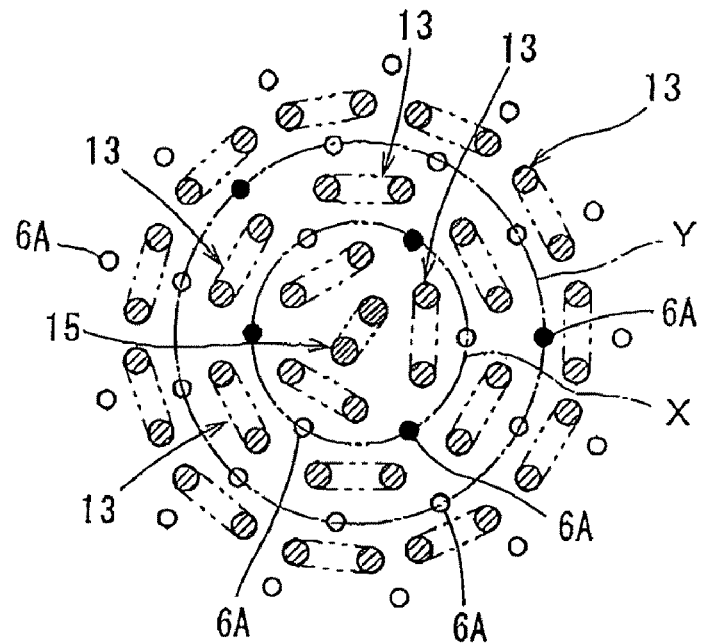
FIG. 7 is a cross-sectional view around a central part of a reaction furnace, which shows control of opened/closed of ejection nozzle valves in a stabilizing step.
Figure 7B:
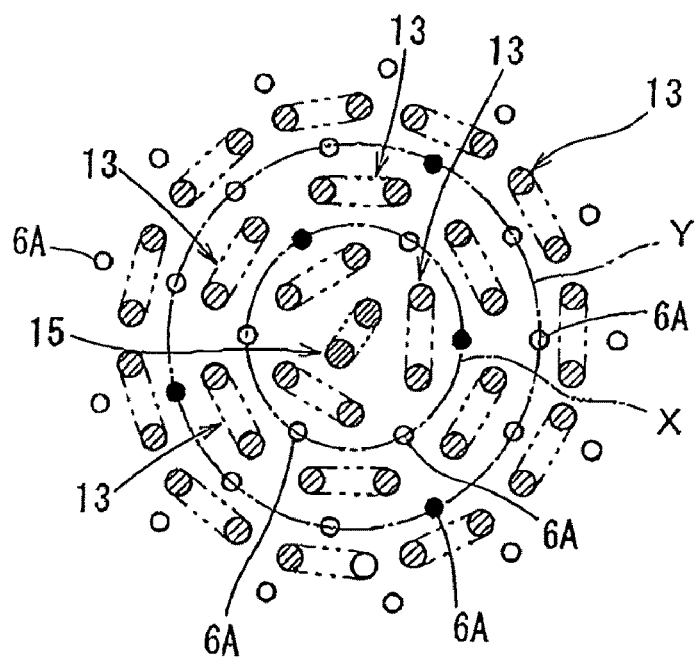

A control in this stabilizing step is common to the examples and the comparative example. Immediately after the start of the reaction, among concentrically arranged gas ejection ports 6A, five gas ejection ports 6A are selected from gas ejection ports 6A located in the innermost (X) and next (Y) circumferences without being biased to particular positions, as indicated by black circle in FIG. 7A, and valves 21 of the gas supplying pipe 10 connected to the selected gas ejection ports 6A are closed. In FIG. 7A, ejection nozzles 6 with valves 21 opened are denoted by white circle and ejection nozzles 6 with valves 21 closed are denoted by black circle. The state shown in FIG. 7A is maintained for the 20 minutes. After the 20 minutes, five gas ejection ports 6A are selected from the gas ejection ports 6A located in the innermost (X) and next (Y) circumferences with the valves opened in FIG. 7A, as shown in FIG. 7B in which positions of black circle are exchanged with positions of white circle, and while the valves 21 of the gas supplying pipes 10 connected to the selected gas ejection ports 6A are put in the closed state, and the valves 21, which have been closed until now, become opened for 20 minutes. This operation is repeated for 24 hours.

B. Shaping Step

This shaping step exchanges among five kinds of controls including "Control Example 1" to "Control Example 5."

CONTROL EXAMPLE 1

Sixteen gas ejection ports 6A are selected among the concentrically arranged gas ejection ports 6A without being biased to particular positions, and valves 21 of the gas supplying pipe 10 connected to the selected gas ejection ports 6A are closed. This state is maintained for the 20 minutes. After 20 minutes, sixteen gas ejection ports 6A in an opened state are selected, and while the valves 21 of the gas supplying pipes 10 connected to the selected gas ejection ports 6A are put in the closed state, the valves 21, which have been closed until now, become opened for 20 minutes. This operation is repeated for 34 hours.

CONTROL EXAMPLE 2

Sixteen gas ejection ports 6A are selected among the concentrically arranged gas ejection ports 6A without being biased to particular positions, and valves 21 of the gas supplying pipe 10 connected to the selected gas ejection ports 6A are closed. This state is maintained for the 20 minutes. After the 20 minutes, sixteen gas ejection ports 6A in an opened state are selected, and while the valves 21 of the gas supplying pipes 10 connected to the selected gas ejection ports 6A are put in the closed state, the valves 21, which have been closed until now, become opened for 20 minutes. This operation is repeated for 20 hours. The overall operation duration of "Control Example 2" is shorter than that of "Control Example 1."

CONTROL EXAMPLE 3

Sixteen gas ejection ports 6A are selected among the concentrically arranged gas ejection ports 6A without being biased to particular positions, and valves 21 of the gas supplying pipe 10 connected to the selected gas ejection ports 6A are closed. This state is maintained for 20 minutes. After the 20 minutes, sixteen gas ejection ports 6A in an opened state are selected, and while the valves 21 of the gas supplying pipes 10 connected to the selected gas ejection ports 6A are put in the closed state, the valves 21, which have been closed until now, become opened for 20 minutes. This operation is repeated for 45 hours. The overall operation duration of "Control Example 3" is longer than that of "Control Example 1."

CONTROL EXAMPLE 4

Twelve gas ejection ports 6A are selected among the concentrically arranged gas ejection ports 6A without being biased to particular positions, and valves 21 of the gas supplying pipe 10 connected to the selected gas ejection ports 6A are closed. This state is maintained for 20 minutes. After the 20 minutes, twelve gas ejection ports 6A in an opened state are selected, and while the valves 21 of the gas supplying pipes 10 connected to the selected gas ejection ports 6A are put in the closed state, the valves 21, which have been closed until now, become opened for 20 minutes. This operation is repeated for 34 hours. The number of closed simultaneously gas ejection ports 6A of "Control Example 4" is smaller than that of "Control Example 1."

CONTROL EXAMPLE 5

Twenty seven gas ejection ports 6A are selected among the concentrically arranged gas ejection ports 6A without being biased to particular positions, and valves 21 of the gas supplying pipe 10 connected to the selected gas ejection ports 6A are closed. This state is maintained for 20 minutes. After the 20 minutes, twenty seven gas ejection ports 6A in an opened state are selected, and while the valves 21 of the gas supplying pipes 10 connected to the selected gas ejection ports 6A are put in the closed state, the valves 21, which have been closed until now, become opened for 20 minutes. This operation is repeated for 34 hours. The number of closed simultaneously gas ejection ports 6A of "Control Example 5" is larger than that of "Control Example 1."

C. Growing Step

This growing step exchanges among three kinds of controls including "Control Example 6" to "Control Example 8."

CONTROL EXAMPLE 6

Eight gas ejection ports 6A are selected among the concentrically arranged gas ejection ports 6A without being biased to particular positions, and valves 21 of the gas supplying pipe 10 connected to the selected gas ejection ports 6A are closed. This state is maintained for 20 minutes. After the 20 minutes, eight gas ejection ports 6A in an opened state are selected, and while the valves 21 of the gas supplying pipes 10 connected to the selected gas ejection ports 6A are put in the closed state, the valves 21, which have been closed until now, become opened for 20 minutes. This operation is repeated until the end of the deposition process.

CONTROL EXAMPLE 7

Four gas ejection ports 6A are selected among the concentrically arranged gas ejection ports 6A without being biased to particular positions, and valves 21 of the gas supplying pipe 10 connected to the selected gas ejection ports 6A are closed. This state is maintained for 20 minutes. After the 20 minutes, four gas ejection ports 6A in an opened state are selected, and while the valves 21 of the gas supplying pipes 10 connected to the selected gas ejection ports 6A are put in the closed state, the valves 21, which have been closed until now, becomes opened for 20 minutes. This operation is repeated until end of deposition process. The number of closed simultaneously gas ejection ports 6A of "Control Example 7" is smaller than that of "Control Example 6."

CONTROL EXAMPLE 8

Twelve gas ejection ports 6A are selected among the concentrically arranged gas ejection ports 6A without being biased to particular positions, and valves 21 of the gas supplying pipe 10 connected to the selected gas ejection ports 6A are closed. This state is maintained for 20 minutes. After the 20 minutes, twelve gas ejection ports 6A in an opened state are selected, and while the valves 21 of the gas supplying pipes 10 connected to the selected gas ejection ports 6A are put in the closed state, the valves 21, which have been closed until now, become opened for 20 minutes. This operation is repeated until the end of the deposition process. The number of closed simultaneously gas ejection ports 6A of "Control Example 8" is larger than that of "Control Example 6."

In addition, for the comparative example, polycrystalline silicon was formed with no valve control after the stabilizing step and under the same flow rate control as the example shown in FIG. 4.

Although it has been illustrated in the above embodiments that the gas ejection ports 6A are concentrically arranged, without being limited to the concentric arranged, they may be arranged in any manner as long as they are uniformly dispersed at the inner bottom portion of the reaction furnace 1. The detailed configuration of the embodiments can be modified in various ways without departing from the spirit and scope of the present invention. For example, although it has been illustrated in the embodiments that the cross section of silicon seed rods is rectangular, the silicon seed rods may have other cross sectional shapes including a round rod shape.

In addition, in the shaping step, although it has been illustrated in the above embodiments that after increase of the ejection velocity at a rate higher than that in the stabilizing step as shown in B1 of FIG. 4, the ejection velocity is

TABLE 1

| | | Example. A | Example. B | Example. C | Example. D | Example. E | Example. F | Example. G | Comparative Example |
|---|---|---|---|---|---|---|---|---|---|
| Valve Control | Stabilizing step | Common | | | | | | | |
| | Shaping step | Control Example. 1 | Control Example. 2 | Control Example. 3 | Control Example. 4 | Control Example. 5 | Control Example. 1 | Control Example. 1 | None |
| | Growing step | Control Example. 6 | Control Example. 6 | Control Example. 6 | Control Example. 6 | Control Example. 6 | Control Example. 7 | Control Example. 8 | None |
| Weight of Deposition (1) (kg) | | 5,010 | 5,207 | 4,296 | 5,142 | 4,663 | 5,061 | 4,725 | 5,341 |
| Percentage of smooth surface (2) (%) | | 72 | 64 | 78 | 67 | 76 | 68 | 74 | 54 |
| (1) × (2) (kg) | | 3,607 | 3,332 | 3,351 | 3,445 | 3,544 | 3,441 | 3,497 | 2,884 |

For the controls in the above table, when silicon rods were formed according to the conventional method with no valve control after the stabilizing, the weight of deposition was 5,341 kg and the percentage of smooth surface was 54%. It can be seen from the table that the examples show a higher percentage of smooth surface and higher quality than the conventional method.

For Example B, concave portions do not disappear since the duration of the shaping step is short, and the percentage of smooth surface is lowered due to undesired shape morphology with the concave portions as starting points.

For Example C, although the yield of smooth surface is somewhat low, the yield is higher than comparative example. In addition, since the duration of the shaping step is long, it takes a long duration to generate a temperature distribution between a location where a gas flows and a location where a gas does not flow, which results in damage to silicon rods due to the temperature distributions and hence stoppage of deposition.

For Example D, since the number of opened valves' in the shaping step is large the raw material gas cannot be sufficiently supplied to the upper side of silicon rods, which results in undesired shape morphology.

For Example E, since the number of opened valves in the shaping step is small, and the gas flow rate is high, surfaces of silicon rods become cooled, which results in hindrance to growth of silicon rods.

For Example F, since the number of opened valves in the growing step is large the raw material gas cannot be sufficiently supplied to the upper side of silicon rods, which results in undesired shape morphology.

For Example G, since the number of opened valves in the growing step is small, and the gas flow rate is high, surfaces of silicon rods become cooled, which results in hindrance to growth of silicon rods.

increased at the same increasing rate of the stabilizing step shown in B2, without being limited to the same increasing rate of the stabilizing step, the ejection velocity may be increased at a rate lower than the increasing rate of B1.

While preferred embodiments of the present invention have been described and illustrated above, it should be understood that these are exemplary of the present invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A method for manufacturing polycrystalline silicon, in which a plurality of silicon seed rods stood in a reaction furnace is heated and polycrystalline silicon is deposited on surfaces of the silicon seed rods by a raw material gas ejected from gas ejection ports located in an inner bottom part of the reaction furnace, the method comprising:
   a stabilizing step of deposition wherein a velocity of ejecting the raw material gas from the gas ejection ports is gradually increased in a first stage of the deposition of the polycrystalline silicon;
   a shaping step wherein first the ejection velocity is increased at an increasing rate higher than that in the stabilizing step and then the ejection velocity is gradually increased at a rate lower than the increasing rate; and
   a growing step wherein, after the shaping step, the ejection velocity is made slower than that at the end of the shaping step.

2. The method according to claim 1, wherein the duration required for the shaping step corresponds to 20 to 35% of the total duration of the deposition of the polycrystalline silicon.

3. The method according to claim 1, wherein a plurality of the gas ejection ports is branched from a gas supplying pipe, and in the shaping step, an ejection velocity from a part of gas ejection ports is increased by closing the other of the plurality of gas ejection ports.

4. The method according to claim 3, wherein, in the shaping step, 30% to 55% of the gas ejection ports are closed.

5. The method according to claim 3, wherein, in the growing step, the velocity of ejecting the raw material gas is decreased by making the number of closed gas ejection ports less than that in the shaping step.

6. The method according to claim 5, wherein, in the growing step, 10% to 20% of the gas ejection ports are closed.

7. The method according to any one of claim 3, wherein the gas ejection ports to be closed are switched to the other gas ejection ports, thereby switching between an opened/closed state, at every predetermined duration.

* * * * *